United States Patent Office 3,102,017
Patented Aug. 27, 1963

3,102,017
PROCESS FOR ADDITIONAL CORN-EAR GROWTH
Robert A. Shurter, Jr., and David O. Howe, Terre Haute, Ind., assignors to Commercial Solvents Corporation, New York, N.Y., a corporation of Maryland
No Drawing. Filed Aug. 31, 1960, Ser. No. 53,073
4 Claims. (Cl. 71—2.1)

Our new invention relates to increasing corn production and more particularly to a process for the inducement of the growth of additional ears of corn per stalk which comprises treating the uppermost female reproductive organs of the corn stalk with gibberellins.

Ears of corn develop from the upper one or more axillary shoots of the corn stalk, depending upon whether the plants are single or multiple-eared types. However, soil fertility and rate of planting also have some influence on the number of upper axillary shoots which develop into ears. The axillary shoots immediately below those which normally develop into ears, do not produce ears and, in general, do not develop beyond the initial stages. The furthering of development of these lower axillary shoots has been an untapped source for increasing corn production.

The most obvious way to increase corn yields with all other normal production factors at optimum efficiency is to increase the number of ears of corn per stalk. Many people expending much money have attempted to accomplish this end by varied means with no apparent success. As a result, most of the corn grown today contains but one ear of corn per stalk.

We have now discovered a new process to induce the growth of additional ears of corn per stalk. Our new process is especially suited for areas in which land is at a premium and high corn yield production is desired.

Our new process comprises essentially applying gibberellins to the uppermost two or three ear shoots of the corn stalk. In our process the gibberellins are applied to the female reproductive organs of the corn plant as soon as they emerge and become identifiable. The gibberellin treatment which we use, can be applied with concentrations of gibberellins of about 2,500 p.p.m. We have determined that general statements about the optimum or minimum concentrations necessary to carry out the process of our invention cannot be made, as the concentrations necessary will vary from species to species. Concentrations effective for the process of our invention have been observed on some species in the range from about 500 p.p.m. to about 10,000 p.p.m.

The gibberellins which we have found to be active in our new process are all of the active gibberellins and gibberellic acid derivatives including the gibberellins known as gibberellin $A_2$:

$C_{19}H_{26}O_6$ (empirical formula)

$A_1$:

$C_{19}H_{24}O_6$ (empirical formula)

$A_3$ (also known as X and as gibberellic acid):

$C_{19}H_{22}O_6$ (empirical formula)

methyl gibberellic acid esters, etc. As used herein, and in the appended claims, the terms "gibberellin" and gibberellic acid compounds are used interchangeably and are intended to include any of the active gibberellins and active derivatives thereof.

More specifically, our process consists of applying gibberellins to the uppermost two or three ear shoots of the corn stalk. Only the female reproductive organs of the corn plant are thus treated. This can be accomplished by a directed controlled spray to the female reproductive organs or by injections, using a hypodermic needle, directly into the ear branch stems of the corn plant. Particular precautions should be made to avoid applying gibberellins to the tassel.

When we apply the gibberellin as a spray we prefer to make 50 milliliters of a 2,500 p.p.m. gibberellin solution. We dissolve 175 milligrams of gibberellin in 0.1 milliliter of ethyl alcohol and then add to this 50 milliliters of water. To the above solution we add 0.05 milliliter of Tween 20 as a spreader. Tween 20 is a polyoxyethylene sorbitan monolaurate type surfactant manufactured by the Atlas Powder Company of Wilmington, Delaware. To make a 1,000 p.p.m. solution, we would use the same procedure as for the 2,500 p.p.m. solution except that we would use 50 milligrams of gibberellins instead of 175 milligrams of gibberellins.

For hypodermic needle injections we prefer to use liquid lanolin-gibberellin compositions prepared by stirring the gibberellin into liquid lanolin. For example, a 10,000 p.p.m. gibberellin solution can be prepared by mixing 100 milligrams of gibberellin with 10 grams of liquid lanolin, or if preferred, the gibberellin can be dissolved in a very small quantity (one or two milliliters) of ethyl alcohol and this solution mixed with the liquid lanolin.

The time to apply the gibberellins to the female reproductive organs of the corn plant cannot be defined chronologically as there will be variations in development due to growing conditions complicated by species variations. The female reproductive organs of the corn plant are treated with the gibberellins during the period starting with the emergence of identifiable ear shoots and the time of pollination. This physiological point of time in the growth cycle of the corn plant is easily identifiable by anyone skilled in the art. At this time, in the growth cycle of the corn plant, the ear shoots are visibly developing and the tassel is up.

Now having described our invention, what we claim is:

1. A process for the inducement of the development of additional ears of corn per stalk, which comprises applying gibberellic acid compounds to the uppermost several female reproductive organs of the corn stalk during the period commencing with the emergence of identifiable ear-shoots to the time of pollination, and at a rate sufficient to induce the development of additional ears of corn.

2. The process of claim 1 wherein the gibberellic acid compounds are applied in concentrations from about 500 p.p.m. to about 10,000 p.p.m.

3. The process of claim 1 wherein the gibberellic acid compounds are applied by spraying a solution of gibberellic acid compounds.

4. The process of claim 1 wherein the gibberellic acid compounds are applied as a liquid formulation that is injected into the ear branch stems of the corn plant.

References Cited in the file of this patent
UNITED STATES PATENTS
2,842,051    Brian et al. _____ July 8, 1958

OTHER REFERENCES

"Chemical and Engineering News," Sept. 17, 1956, pages 4496 and 4501.
"Science News Letter," Sept. 8, 1956, page 152.